United States Patent
Ishikawa

(10) Patent No.: US 11,595,534 B2
(45) Date of Patent: Feb. 28, 2023

(54) INFORMATION PROCESSING APPARATUS, METHOD OF CONTROLLING INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Akira Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/827,345

(22) Filed: Mar. 23, 2020

(65) Prior Publication Data

US 2020/0314262 A1 Oct. 1, 2020

(30) Foreign Application Priority Data

Mar. 29, 2019 (JP) .............................. JP2019-068842

(51) Int. Cl.
*G06F 15/00* (2006.01)
*H04N 1/00* (2006.01)
*H04L 12/66* (2006.01)
*H04L 45/745* (2022.01)
*G06F 3/12* (2006.01)

(52) U.S. Cl.
CPC ......... *H04N 1/00395* (2013.01); *H04L 12/66* (2013.01); *H04L 45/745* (2013.01); *H04N 1/00477* (2013.01); *G06F 3/1286* (2013.01)

(58) Field of Classification Search
CPC ............ H04N 1/00395; H04N 1/00477; H04L 12/66; H04L 45/745; G06F 3/1286

USPC ........................................................ 358/1.13
See application file for complete search history.

(56) References Cited

U.S. PATENT DOCUMENTS

| | | | |
|---|---|---|---|
| 8,055,800 B1 | 11/2011 | Bardzil | |
| 2009/0262746 A1* | 10/2009 | Kwak | H04W 40/00 370/401 |
| 2011/0058203 A1* | 3/2011 | Hwang | G06F 3/1236 358/1.13 |
| 2011/0238798 A1* | 9/2011 | Seki | H04L 61/2007 709/220 |
| 2019/0021035 A1* | 1/2019 | Ishikawa | H04L 61/2046 |
| 2019/0132457 A1* | 5/2019 | Sako | H04N 1/001 |
| 2019/0312775 A1* | 10/2019 | Patil | H04L 41/0859 |

FOREIGN PATENT DOCUMENTS

| | | |
|---|---|---|
| CN | 101233729 A | 7/2008 |
| CN | 109257331 A | 1/2019 |
| JP | 07-162416 A | 6/1995 |
| JP | 2019-22038 A | 2/2019 |

* cited by examiner

*Primary Examiner* — Mark R Milia
(74) *Attorney, Agent, or Firm* — Canon U.S.A., Inc. IP Division

(57) ABSTRACT

An information processing apparatus, for transmitting data to an external apparatus via a plurality of different communication interfaces, includes at least one memory that stores a set of instructions, and at least one processor that executes the instructions to provide accepting a setting of a routing path, based on a user operation, and to provide restricting a routing path indicating a default route from being set through the accepting.

13 Claims, 14 Drawing Sheets

```
Destination  : Subnet Length : Gateway Address
172.16.1.0   : /16           : 172.16.0.1
0.0.0.0      : /0            : 192.168.0.1
```

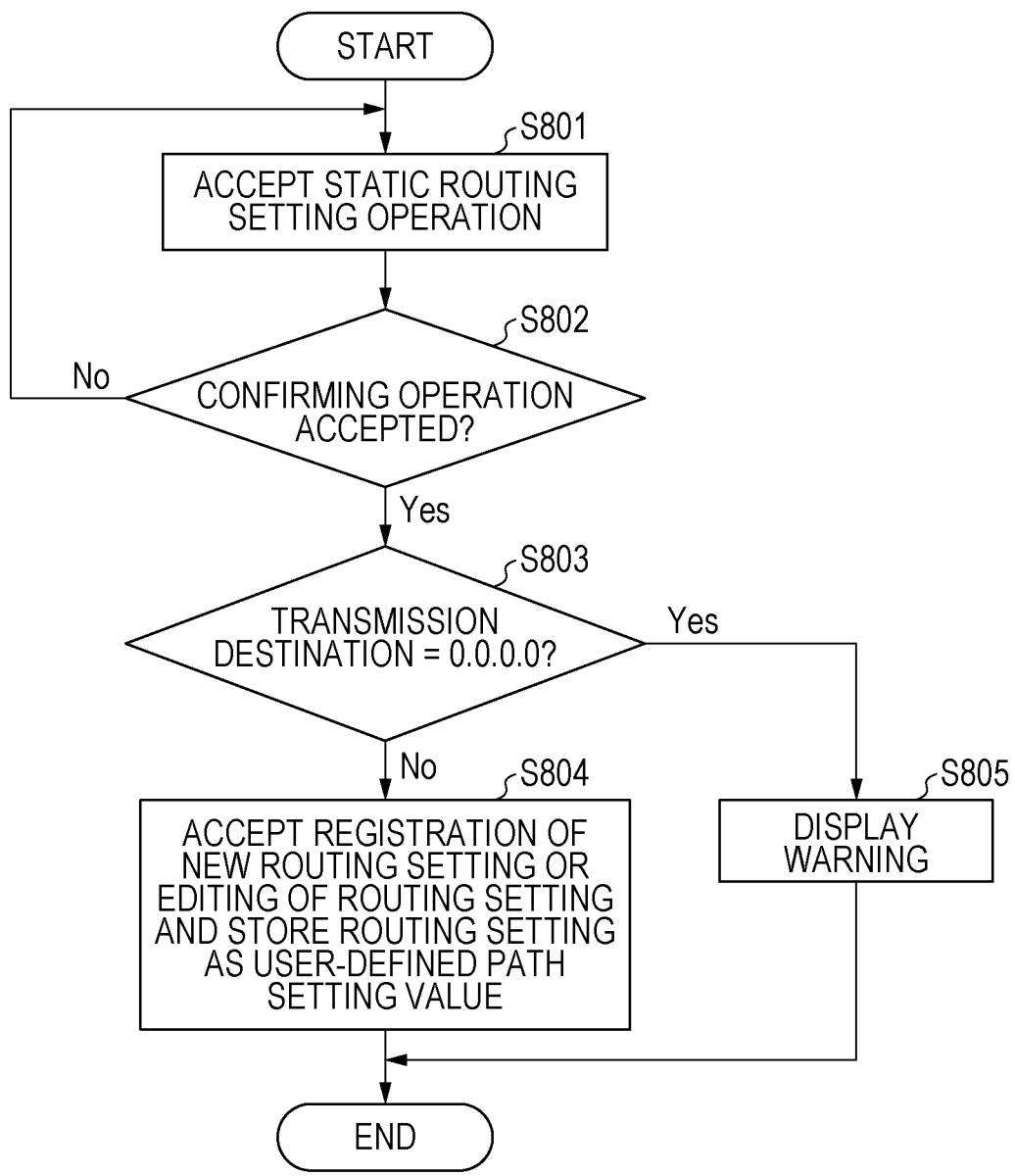

FIG. 10A

| Scan to Send | ⚙ |

Ready to Send

Number of Destinations : 1 scan    ¥¥172.16.23.233¥Scan

- Settings History
- Often Used Settings
- ▮▮/▮▮ Auto (Color/Grayscale)
- 300x300 dpi
- A4
- PDF (Highly Compressed)
- Both-Sided Original
- Orientation of Original
- Other Functions Designate Destination | Details | Delete Destination | Cc Bcc

FIG. 10B

Scan to Send  ⚙

<File>    Number of Destinations : 1
Please Designate Destination File Server.

Protocol  [Windows (SMB) ▼]

Host Name  [                    ]
Path to Folder  [                    ]
User Name  [                    ]
Password  [                    ]

Next Destination | Register in Address Book | Search for Hosts | Reference

✕ Cancel    OK

INFORMATION PROCESSING APPARATUS, METHOD OF CONTROLLING INFORMATION PROCESSING APPARATUS, AND NON-TRANSITORY COMPUTER-READABLE STORAGE MEDIUM

BACKGROUND

Field

The present disclosure relates to an information processing apparatus configured to transmit data to an external apparatus, a method of controlling the information processing apparatus, and a non-transitory computer-readable storage medium.

Description of the Related Art

Because of the desired security and complicated functionality of a network, a configuration for using a plurality of local area networks (LANs) for different purposes at offices, commercial facilities, and so on has recently become common. Image processing apparatuses used in such an environment are also desired to provide services to the plurality of LANs.

In order for an apparatus connected to a plurality of LANs using a plurality of network interfaces to use different LANs depending on the intention of a user, path information indicating a LAN to which a network packet is to be transmitted needs to be set in the apparatus.

Japanese Patent Laid-Open No. 07-162416 discloses a mechanism for switching between communication destinations by registering routing paths each associating a transmission destination of a network packet with a gateway address in a routing table managed by an operating system (OS).

In addition, Japanese Patent Laid-Open No. 2019-22038 discloses a multifunction peripheral (MFP) including a plurality of network interfaces to support a plurality of LANs. It is common that image processing apparatuses such as the MFP accept settings of an Internet Protocol (IP) address, a subnet mask, and a default gateway for use in communication via a single setting screen, and register the accepted settings as general network settings.

There is known a technique that enables a network device to specify a default gateway by adding a routing path of a default route indicated by "0.0.0.0/00" to a routing table as network settings.

SUMMARY

According to an aspect of the present disclosure, it has now been determined that there is a downside of the aforementioned technique that the way in which the settings are made is not intuitive and is not easily understandable for a user having a little knowledge of networks. In addition, once the setting of the default gateway is overwritten because of an operation mistake made by a user having a little knowledge of networks, routing control originally intended by the user may not be performed. Further, when the default gateway is settable on both an existing setting screen and a setting screen of the routing path, different values may be set on the different setting screens. In this case, there is a downside that it is difficult for a user such as an administrator to determine which of the default gateways is actually valid.

According to another aspect of the present disclosure, control is implemented that makes a default route not settable in a case where settings of a routing path is accepted. According to yet another aspect of the present disclosure, a mechanism is provided in which one of setting methods to be used is determined and, if a default gateway is set using the setting method to be used, the corresponding settings are prioritized. According to still another aspect of the present disclosure, convenience in making network settings in an information processing apparatus is improved.

To implement at least one of the aspects described above, an information processing apparatus according to an embodiment of the present disclosure, which is for transmitting data to an external apparatus via a plurality of different communication interfaces, includes at least one memory that stores a set of instructions, and at least one processor that executes the instructions to provide accepting a setting of a routing path, based on a user operation, and to provide restricting a routing path indicating a default route from being set through the accepting.

Further features of the present disclosure will become apparent from the following description of exemplary embodiments with reference to the attached drawings.

BRIEF DESCRIPTION OF THE DRAWINGS

FIG. 4 is a diagram illustrating an example of a routing table managed by an OS.

FIG. 8 is a flowchart illustrating an example of control performed when a user-defined routing setting is accepted.

FIGS. 10A and 10B illustrate examples of screens displayed on the operation unit of the MFP.

DESCRIPTION OF THE EMBODIMENTS

Embodiments of the present disclosure will be described below with reference to the drawings. Note that the following embodiments do not limit the claims. In addition, not all the combinations of features described in the embodiments are mandatory to the solutions provided by the present disclosure.

First Embodiment

Figure 1:
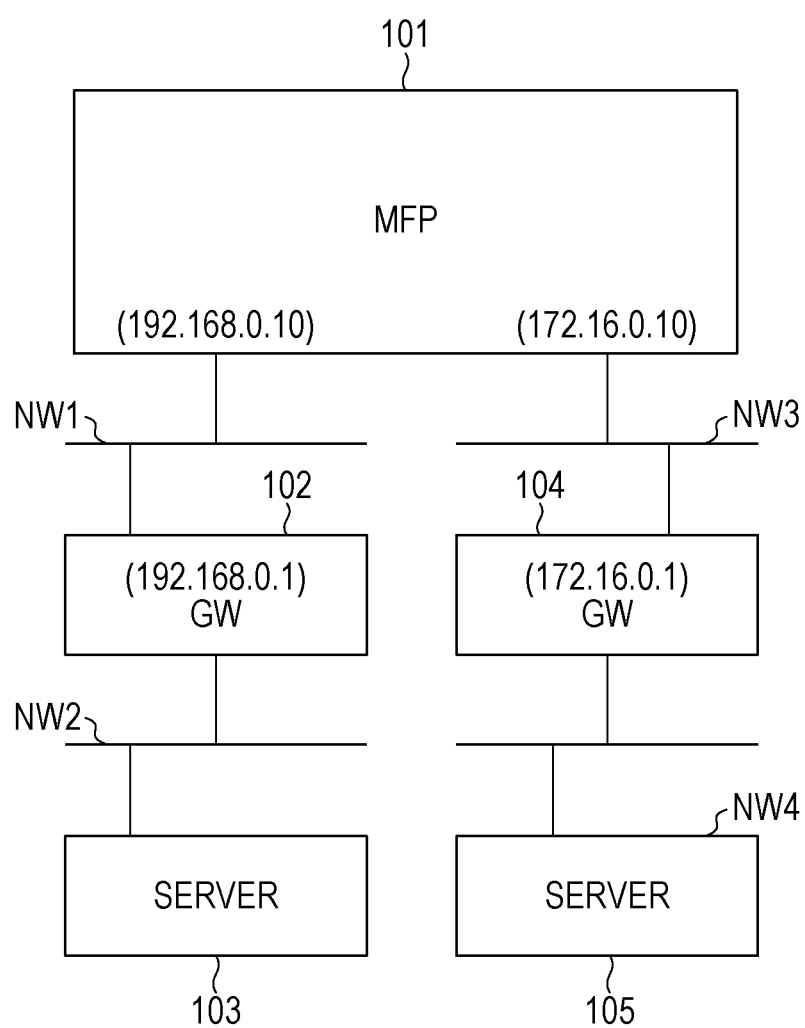
FIG. 1 is a diagram illustrating an example of an image processing system.

A configuration of an image processing system according to a first embodiment of the present disclosure will be described first with reference to FIG. 1. The image processing system according to the first embodiment includes an MFP 101, a gateway (GW) 102, a GW 104, a server 103, and a server 105. In the first embodiment, the MFP 101 will be described as an example of an information processing apparatus. The MFP 101 includes a plurality of communication interfaces including a first communication interface and a second communication interface. The first communication interface is connected to a network NW1. The second communication interface is connected to a network NW3. FIG. 1 illustrates a case where an IP address "192.168.0.10" is set for the first communication interface and an IP address of the gateway apparatus of the network NW1 is "192.168.0.1" by way of example. FIG. 1 also illustrates a case where an IP address "172.16.0.10" is set for the second communication interface and an IP address of the gateway apparatus of the network NW3 is "172.16.0.1" by way of example. Note that a client device (not illustrated), an internal server (not illustrated), and the like may be connected to the networks NW1 and NW3.

The GW 102 is connected to the server 103. The GW 104 is connected to the server 105. The servers 103 and 105 may be, for example, Server Message Block (SMB) servers or Web-based Distributed Authoring and Versioning (WebDAV) servers. In addition, the servers 103 and 105 may be servers capable of receiving and storing files, such as File Transfer Protocol (FTP) servers. Note that types of the servers are merely examples and the servers 103 and 105 may be servers that collect data collected by the MFP 101.

The MFP 101 is capable of transmitting data based on an image resulting from scanning to the servers 103 and 105 and of transmitting data collected by the MFP 101 to the servers 103 and 105. A process of determining a transmission path used when data is transmitted to a server will be described later.

Figure 2:
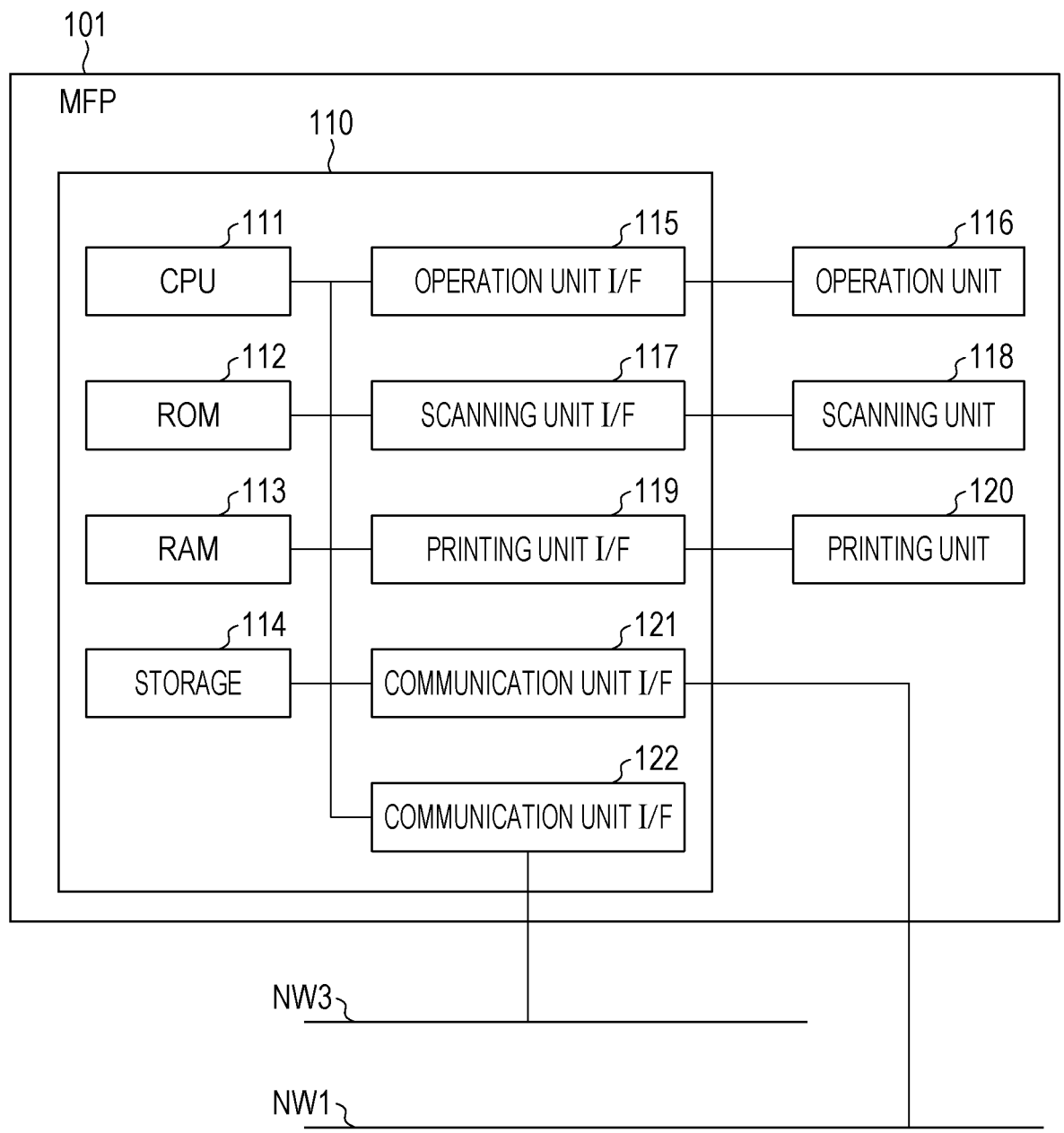
FIG. 2 is a diagram illustrating an example of a hardware configuration of an MFP.

The MFP 101 will be continuously described with reference to FIG. 2. FIG. 2 is a block diagram illustrating an example of a hardware configuration of the MFP 101. The MFP 101 has functions such as a scanner function of scanning an image on a sheet and a file transmission function that enables the scanned image to be transmitted to an external communication apparatus. The MFP 101 also has a printing function of printing an image onto a sheet.

Although the MFP 101 is described as an example of an information processing apparatus in the first embodiment, the information processing apparatus is not limited to this. For example, the information processing apparatus may be a single function peripheral (SFP) not having the printing function, such as a scanner apparatus. In addition, various devices that are desired to switch between a main line and a communication path to another communication destination can be employed.

The MFP 101 includes a control unit 110 that controls operation of the entire MFP 101. The control unit 110 includes a central processing unit (CPU) 111, a read-only memory (ROM) 112, a random access memory (RAM) 113, and a storage 114. The CPU 111 reads a control program stored in the ROM 112 or the storage 114 and performs various kinds of control such as printing control and scanning control. The ROM 112 stores a control program executable by the CPU 111. The RAM 113 is a main memory of the CPU 111 and is used as a work area or a temporarily storage area for loading various control programs. The storage 114 stores print data, image data, various programs, and various kinds of setting information. In the first embodiment, an auxiliary storage device such as a hard disk drive (HDD) is assumed to be the storage 114. Instead of the HDD, a nonvolatile memory such as a solid state drive (SSD) may be used. In this manner, pieces of hardware such as the CPU 111, the ROM 112, and the RAM 113 constitute a so-called computer.

Although it is assumed that a single CPU 111 performs individual processes illustrated in respective flowcharts (described later) using a single memory (the RAM 113) in the MFP 101 according to the first embodiment, another configuration may be employed. For example, a plurality of CPUs, a plurality of RAMs, a plurality of ROMs, and a plurality of storages may be caused to operate in cooperation with one another to perform the individual processes illustrated in the respective flowcharts (described later). In addition, part of the processes may be performed using hardware circuitry.

The control unit 110 also includes an operation unit interface (I/F) 115, a scanning unit I/F 117, a printing unit I/F 119, and communication unit I/Fs 121 and 122. The operation unit I/F 115 connects the control unit 110 and an operation unit 116 to each other. The operation unit 116 includes a liquid crystal display unit having a touch panel function and various hardware keys. The operation unit 116 functions as a display unit configured to display information and as an accepting unit configured to accept an instruction from a user.

The scanning unit I/F 117 connects the control unit 110 and a scanning unit 118 to each other. The scanning unit 118 scans an original placed on an original table or an automatic sheet feeder (ADF) to generate a scanned image. The generated scanned image is stored in the storage 114 or the RAM 113. The scanned image generated by the scanning unit 118 is transmitted to a communication apparatus or is used in printing of an image onto a sheet, for example.

The printing unit I/F 119 connects the control unit 110 and a printing unit 120 to each other. The scanned image that is generated by the scanning unit 118 and is stored in the storage 114 or the RAM 113 is transferred to the printing unit 120 from the control unit 110 via the printing unit I/F 119. The printing unit 120 receives the scanned image from the control unit 110 via the printing unit I/F 119 and prints the scanned image onto a sheet. The printing unit 120 is also capable of performing printing based on a print job received from an external apparatus. Note that the printing method employed by the printing unit 120 may be an electrophotographic method or an inkjet method. Alternatively, another printing method such as a thermal transfer method may also be employed.

The communication unit IF 121 is the first communication interface of the MFP 101. The control unit 110 is connected to the network NW1 via the communication unit I/F 121. The communication unit I/F 121 transmits and receives data to and from a device or server in a network segment, such as a network NW2, different from the network segment of the network NW1, via a device or server on the network NW1 or the GW 102 on the network NW1.

The communication unit I/F 122 is the second communication interface of the MFP 101. The control unit 110 is connected to the network NW3 via the communication unit IF 122. The communication unit I/F 122 transmits and receives data to and from a device or server in a network segment, such as a network NW4, different from the network segment of the network NW3, via a device or server on the network NW3 or the GW 104 on the network NW3.

Although it is assumed in the first embodiment that the communication unit I/Fs 121 and 122 are communication interfaces that perform wired communication conforming to Ethernet (registered trademark), the communication unit I/Fs 121 and 122 are not limited to this type of communication interfaces. For example, one of the communication unit I/Fs 121 and 122 may be a wireless communication interface conforming to the Institute of Electrical and Electronics Engineers (IEEE) 802.11 series. In addition, both the communication unit I/Fs 121 and 122 may be wireless communication interfaces. Further, the MFP 101 may include three or more communication interfaces.

In order for the MFP 101 including a plurality of communication interfaces in this manner to use different networks NW of the output destinations depending on the intention of a user, path information indicating the network NW to which a network packet is to be transmitted needs to be set. It is common that an image processing apparatus such as an MFP accepts settings of an IP address, a subnet mask, and a default gateway for use in communication via a single screen and registers the accepted settings as general network settings. It is conceivable to provide a new setting screen that allows a user to set a routing path in order to appropriately use different networks NW of the output destinations. When settings relating to the default gateway are made on both the existing setting screen and the newly provided setting screen of the routing path, there is a downside that it is difficult for a user such as an administrator to determine which of the default gateway settings is actually valid.

In view of at least one of the downsides described above, the first embodiment provides a mechanism for performing control so that the default gateway is to be set on a single screen by restricting a default route from being set via a setting screen that accepts a setting of a routing path. A specific mechanism will be described below.

Figure 3:
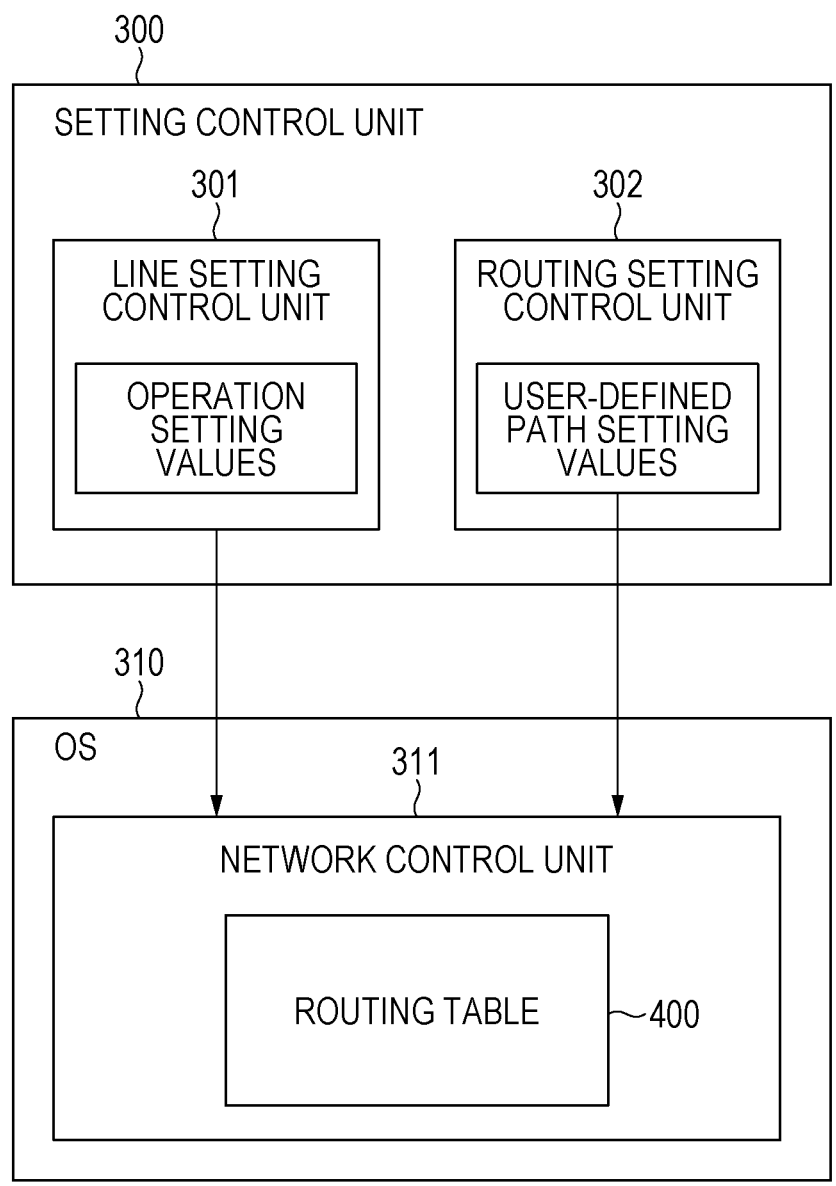
FIG. 3 is a diagram illustrating an example of a software configuration of the MFP.

FIG. 3 illustrates an example of a software configuration of the MFP 101. A setting control unit 300 includes a line setting control unit 301 and a routing setting control unit 302. The line setting control unit 301 provides a setting function relating to various communication interfaces. The routing setting control unit 302 provides a routing path setting function to a user.

The line setting control unit 301 manages operation setting values relating to the communication interfaces. As the operation setting values, setting values of an IP address, a subnet mask, and a default gateway that are allocated to each communication interface are stored. The routing setting control unit 302 manages path setting values defined by the user. As the path setting values, a routing path in which a destination, a subnet mask length, and an output-destination gateway are associated with one another is stored.

The settings of the gateway made by the line setting control unit 301 and the path setting values set by the routing setting control unit 302 are referred to by a network control unit 311 of an OS 310 and are registered in a routing table 400 managed by the OS 310. When data is transmitted from a transmission application (not illustrated), the network control unit 311 of the OS 310 receives the transmitted data and determines the output destination of the data on the basis of the routing table 400. The network control unit 311 also transmits the data to the determined output destination.

FIG. 4 illustrates an example of the routing table 400 managed by the OS 310. The routing table 400 includes a plurality of entries. Each of the plurality of entries includes three pieces of information, that is, a destination, a subnet mask length, and a gateway address. The destination and the subnet mask length are information for identifying a destination to which this entry is to be applied. On the other hand, the gateway address indicates an IP address of a gateway apparatus to which data is to be transmitted when the destination set at the time of transmission matches the entry including the destination and the subnet mask length.

For example, an entry of the first row indicates that packets addressed to destinations indicated by 172.16.0.1 to 172.16.255.254 are to be transmitted to a gateway apparatus indicated by 172.16.0.1 (that is, the GW 104 illustrated in FIG. 1). In addition, an entry of the second row indicates the default route used in the case where the routing table 400 does not include information on the following transmission destination of the packet. Thus, the gateway associated with information including the destination of "0.0.0.0" and the subnet mask length of "0" is the default gateway in the routing table 400 of the OS 310. When a plurality of entries match the same destination, an entry having the largest subnet mask length is preferentially used. That is, data to the destination that matches 172.16.0.0/16 is transmitted to the gateway apparatus indicated by 172.16.0.1 (that is, the GW 104 illustrated in FIG. 1). On the other hand, data to the other destinations is transmitted to the gateway apparatus indicated by 192.168.0.1 (that is, the GW 102 illustrated in FIG. 1). Note that data addressed to the same segment is directly transmitted to the destination after identifying the designation, instead of being transmitted to the gateway.

Subsequently, how to modify the operation setting values of the MFP 101 will be described with reference to FIGS. 5A to 7B. FIGS. 5A to 7B illustrate examples of screens displayed on the operation unit 116 of the MFP 101 and all illustrate examples of setting screens displayed on the operation unit 116 of the MFP 101.

A user of the MFP 101 performs an operation on a main menu screen (not illustrated) to display a screen for modifying the operation setting values of the MFP 101. In response to detection of an instruction for displaying the screen for modifying the operation setting values, the CPU 111 changes the screen displayed on the operation unit 116 to a setting screen illustrated in FIG. 5A. The screen illustrated in FIG. 5A includes a large-classification buttons indicating types of settings. The user can activate a screen for making detailed settings via the setting screen illustrated in FIG. 5A. A network-settings key 502 is a key for activating a network setting screen of the MFP 101. A device-settings key 503 is a key used when the user makes device settings such as print settings, scan settings, and date-time settings. A personal-settings key 504 is a key used when different settings (for example, customization of a language to be used and of icons displayed in a main menu) are made for different users who use (who have logged into) the MFP 101. In response to detection of selection of the network-settings key 502, the CPU 111 changes the screen displayed on the operation unit 116 to a network setting screen illustrated in FIG. 5B. The user can make various network settings via the setting screen illustrated in FIG. 5B. A main-line-settings key 512 is a key used when the user makes settings related to the first communication interface. A subline-settings key 513 is a key used when the user makes settings related to the second communication interface. Personal settings in the case where the main-line-settings key 512 or the subline-settings key 513 is selected will be described later with reference to FIGS. 6A and 6B. A routing-settings key 516 is a key used when the user explicitly desires to register a routing path. How a routing path is set when the routing-settings key 516 is selected will be described with reference to FIGS. 7A and 7B. An interface-selection key 514 is a key used when the user makes a setting of enabling/disabling the communication interface. In response to detection of selection of the interface-selection key 514, the CPU 111 changes the screen displayed on the operation unit 116 to a setting screen illustrated in FIG. 5C.

Figure 5A:
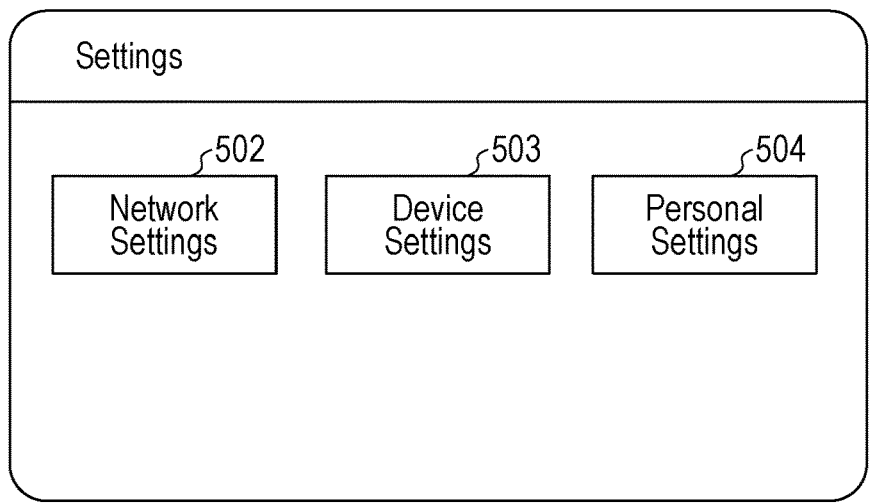
FIGS. 5A, 5B, and 5C illustrate examples of screens displayed on an operation unit of the MFP.
Figure 5B:
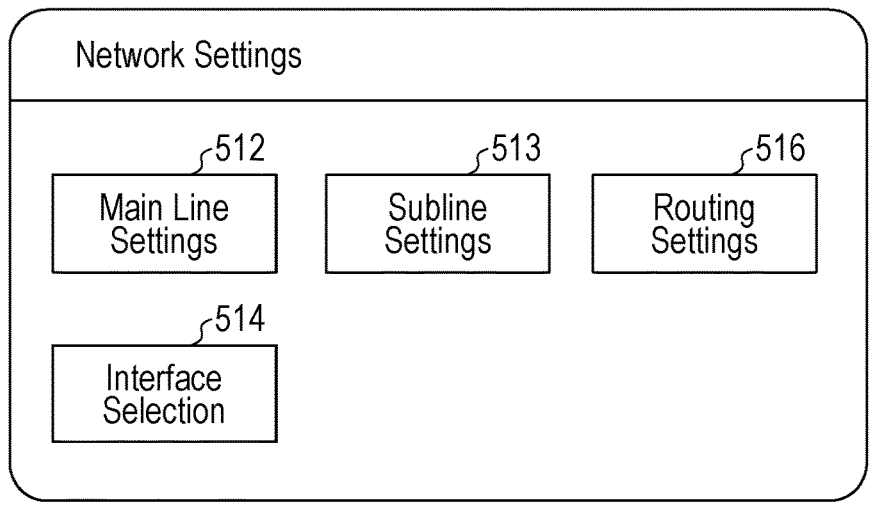
Figure 5C:
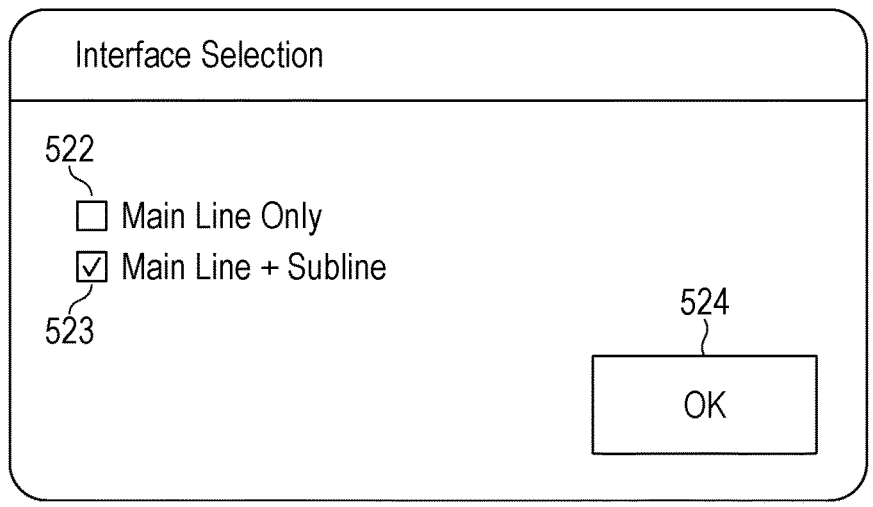

The user can make a setting related to the communication interface(s) to be used, via the screen illustrated in FIG. 5C. Checkboxes 522 and 523 are configured such that one of the checkboxes 522 and 523 is exclusively selected. When the checkbox 522 is selected, only the communication unit I/F 121 is enabled. On the other hand, when the checkbox 523 is selected, the communication unit I/F 121 is enabled as the main line and the communication unit I/F 122 is enabled as the subline. Note that the main line is treated as the first communication interface having a higher use priority than the subline. An OK key 524 is a key used when the user makes the setting made via the screen illustrated in FIG. 5C effective. It is assumed that the setting made via the screen illustrated in FIG. 5C is stored in the storage 114 or the RAM 113. In the case where the MFP 101 includes three or more communication interfaces, the MFP 101 may appropriately adopt a user interface that allows the user to select one main line and one or more sublines that are used in addition to the main line.

Figure 6A:
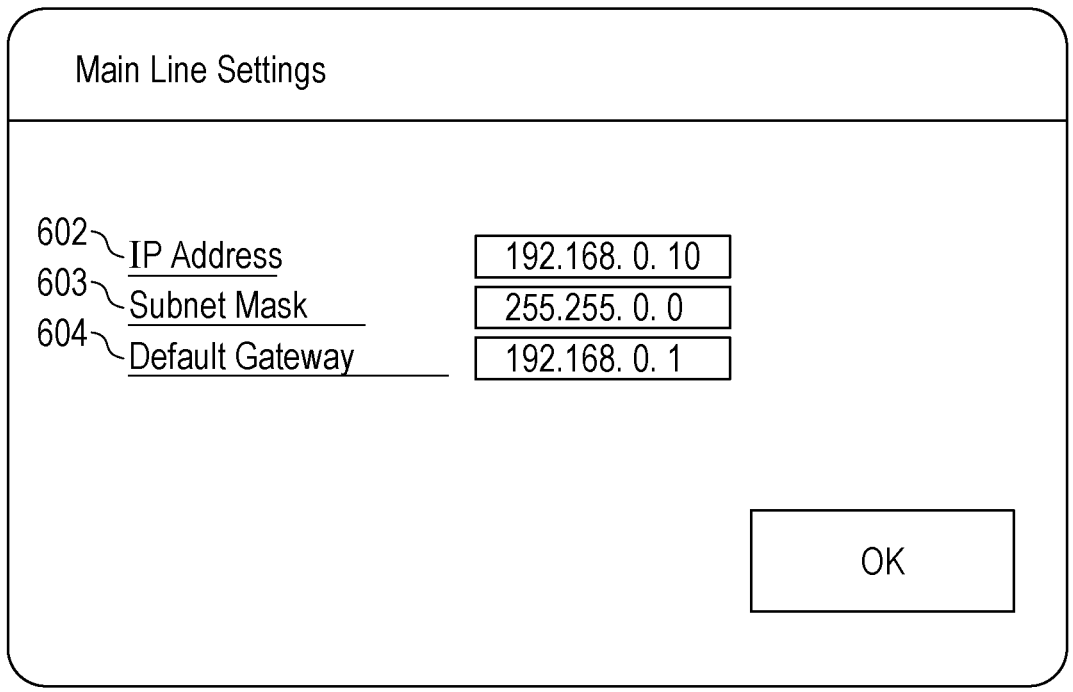
FIGS. 6A and 6B illustrate examples of screens displayed on the operation unit of the MFP.
Figure 6B:
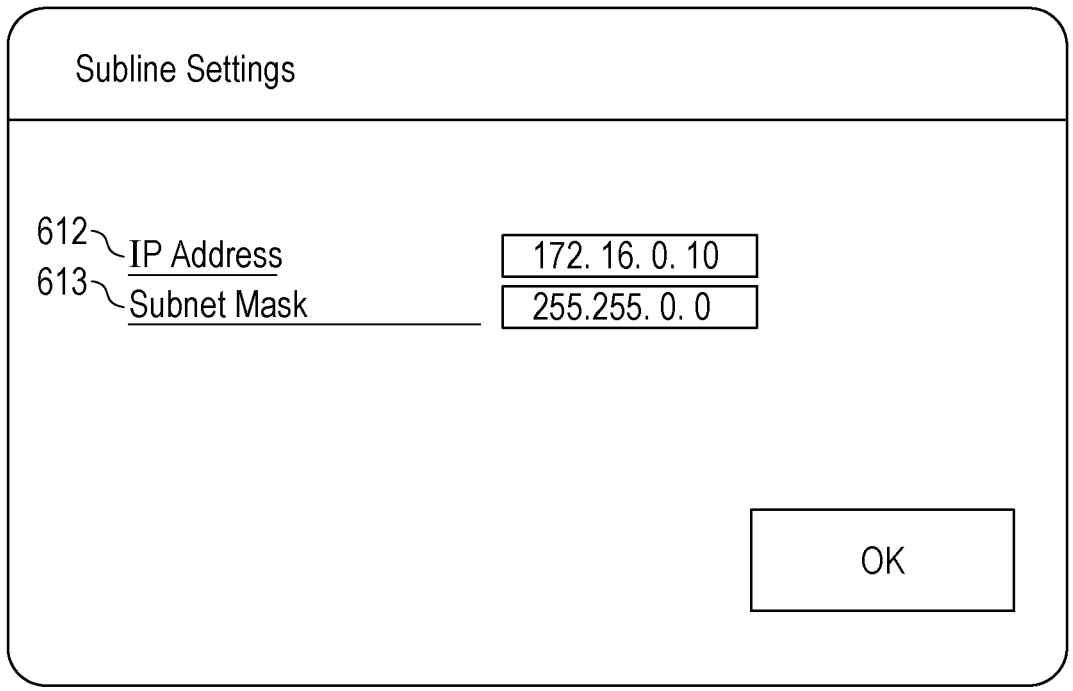

The network settings for the main line and the subline will be described with reference to FIGS. 6A and 6B. FIGS. 6A and 6B illustrate examples of screens provided by the line setting control unit 301. As described above, the main line is treated as an interface having a higher use priority. Accordingly, as illustrated in FIG. 6A, network settings for the main line include a setting item for the default gateway which is not included in network settings for the subline illustrated in FIG. 6B. In response to detection of selection of the main-line-settings key 512, the CPU 111 changes the screen displayed on the operation unit 116 to the screen illustrated in FIG. 6A. In response to detection of selection of the subline-settings key 513, the CPU 111 changes the screen displayed on the operation unit 116 to the screen illustrated in FIG. 6B.

The user can input setting values in areas 602 to 604. The area 602 is an area in which the user inputs an IP address that is allocated to the communication unit I/F 121 serving as the main line. The area 603 is an area in which the user inputs a subnet mask. The area 604 is an area in which the user inputs a default gateway address used when the following transmission destination is unknown to the MFP 101. In response to detection of selection of an OK key, the line setting control unit 301 stores the settings made via the screen illustrated in FIG. 6A in the storage 114 or the RAM 113 as the operation setting values. These settings will be appropriately referred to in flowcharts described below. Note that a setting enabling the use of a Dynamic Host Configuration Protocol (DHCP) server so that the IP address, the subnet mask, and the default gateway are automatically acquired from the DHCP server may be made via the screen illustrated in FIG. 6A. In this case, the IP address, the subnet mask, and the gateway address distributed from the DHCP server are stored as the settings for the communication unit I/F 121. In addition, the stored settings are displayed in the respective areas 602 to 604.

The setting screen for the subline illustrated in FIG. 6B includes areas 612 and 613 in which settings corresponding to the IP address and the subnet mask are to be input and can accept settings related to the communication unit I/F 122. In response to detection of selection of an OK key, the line setting control unit 301 stores the settings in the storage 114 or the RAM 113. Note that the settings for the subline may also be acquired using DHCP. In the case of the network settings for the subline, however, the MFP 101 performs control so that the setting of the gateway is not to be made even if the MFP 101 can acquire the address of the default gateway from the DHCP server.

Figure 7A:
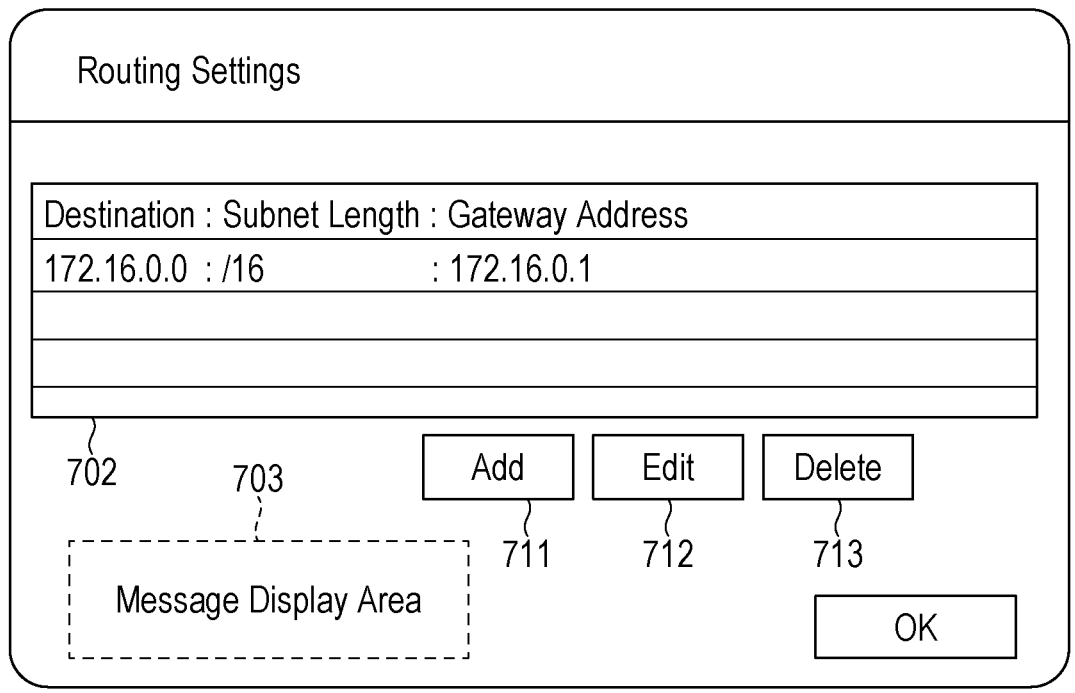
FIGS. 7A and 7B illustrate examples of screens displayed on the operation unit of the MFP.
Figure 7B:
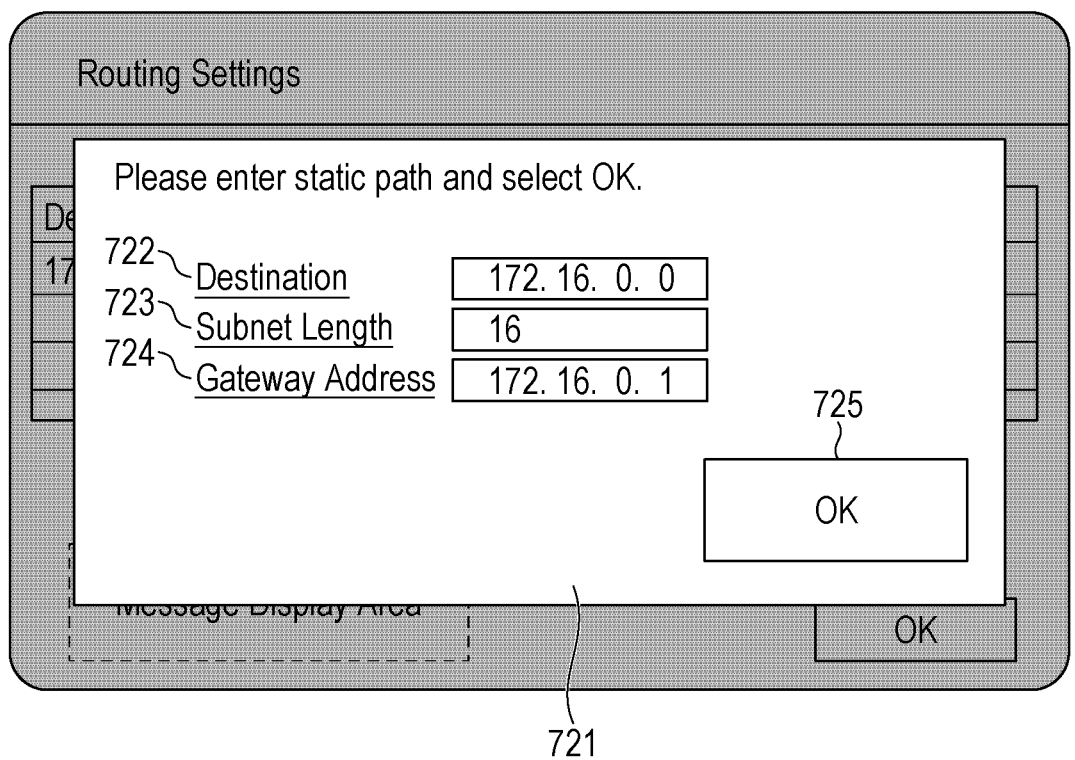

A screen for accepting the routing settings will be described next with reference to FIGS. 7A and 7B. FIGS. 7A and 7B illustrate examples of screens provided by the routing setting control unit 302. In response to detection of selection of the routing-settings key 516, the CPU 111 displays a routing setting screen illustrated in FIG. 7A on the operation unit 116. A display area 702 shows a list of routing paths that have been already registered by the user. FIG. 7A illustrates the case where the user setting corresponding to the entry of the first row described in FIG. 4 is made by way of example. Each row of the display area 702 is selectable through a user operation, and the routing path corresponding to the selected row can be corrected or deleted using a key 712 or a key 713. A key 711 is a key used when the user adds a new routing path. An area 703 is an area in which a message such as a warning or a help is shown to the user.

In response to detection of selection of the key 711 or 712, the routing setting control unit 302 displays a pop-up screen for new registration or editing on the operation unit 116. A pop-up screen 721 illustrated in FIG. 7B is an example of such a pop-up screen. The user can input setting values in areas 722 to 724. The area 722 is an area in which the user inputs an IP address of the destination that provides the routing path. An area 723 is an area in which the user inputs the subnet mask length of the IP address designated as the destination. The area 724 is an area in which the user inputs the gateway address used when data is transmitted to destinations having an address range identified by the settings in the areas 722 and 723.

An OK key 725 is a key for accepting a user operation for confirming the registration or the editing. In response to detection of pressing of the OK key 725, the user-defined routing path is newly registered or corrected on the basis of the settings made via the pop-up screen illustrated in FIG. 7B. The registered routing path is stored in the storage 114 or the RAM 113.

Figure 9:
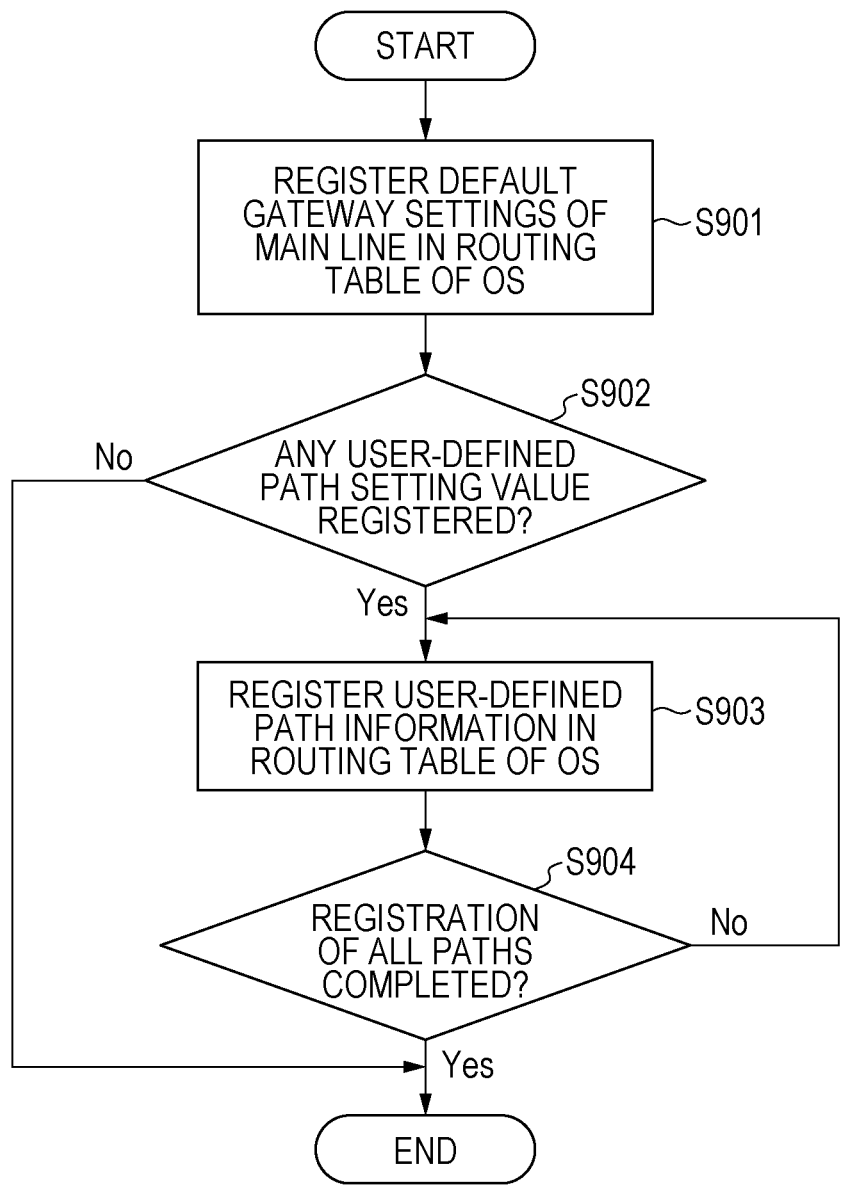
FIG. 9 is a flowchart illustrating an example of control performed when paths are registered in a routing table.
Figure 11:
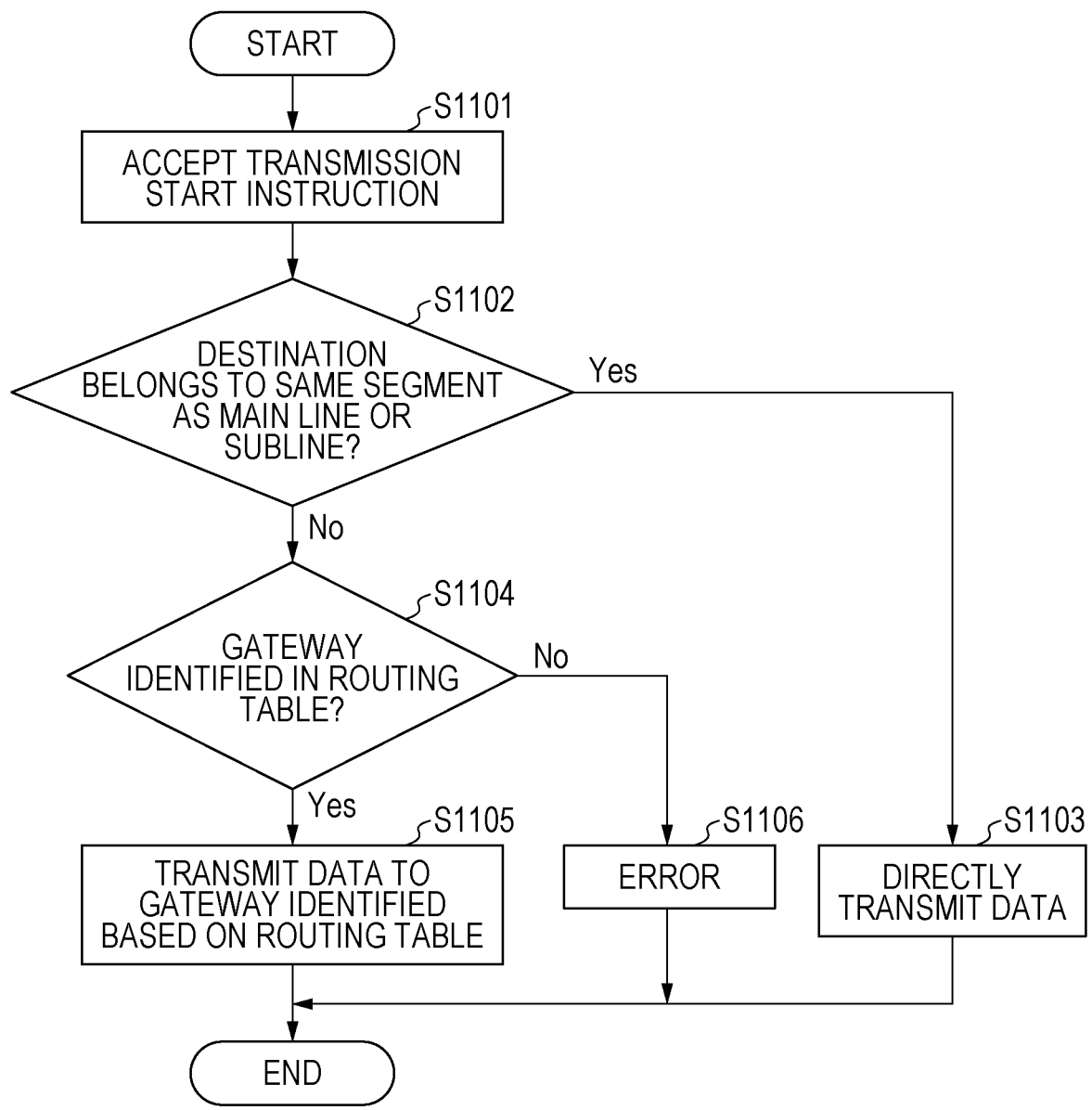
FIG. 11 is a flowchart illustrating an example of control performed when data is transmitted.

In the first embodiment, control is performed so that the default route is not set via the routing setting screen. A specific mechanism will be described with reference to flowcharts of FIGS. 8, 9, and 11. Each operation (step) of the flowcharts of FIGS. 8, 9, and 11 is implemented by the CPU 111 loading a program for implementing each control module that is stored in the ROM 112 or the storage 114 into the RAM 113 and executing the program. Note that it is assumed that data transmission/reception processes or the like are implemented by cooperation of the CPU 111 and the communication unit I/Fs 121 and 122. In addition, in the case where clarification of the subject of processing is desired, the description will be given using a software module executed by the CPU 111 as the subject.

The flowchart illustrated in FIG. 8 is a flowchart for describing how to set a user-defined routing path and starts in response to acceptance of an operation for registering a new routing path or an operation for editing a routing path. In S801, the routing setting control unit 302 accepts an operation for setting a static routing path on the basis of a user operation performed via the operation unit 116.

Then in S802, the routing setting control unit 302 determines whether a user operation for confirming the settings is accepted. If the user operation for confirming the settings is accepted, the process proceeds to S803. If the user operation for confirming the settings is not accepted, the process returns to S801, in which a further setting is waited for. The user operation for confirming the settings is, for example, an operation for selecting the OK key 725.

In S803, the routing setting control unit 302 determines whether "0.0.0.0" is set as the transmission destination accepted in S801. If "0.0.0.0" is set as the transmission destination, the process proceeds to S805. If "0.0.0.0" is not set as the transmission destination, the process proceeds to S804. The processing in S803 is processing for determining whether the default route is set.

In S804, the routing setting control unit 302 accepts registration of a new routing path or editing of a routing path on the basis of the settings input in S801, stores the settings as the setting values of the user-defined routing path in the storage 114 or the RAM 113, and completes the series of steps of the registration process. Note that in the processing of S804, a destination address that is derived by masking the destination input in the area 722 with the subnet mask length input in the area 723 may be set as the destination of the routing path.

On the other hand, in S805, the routing setting control unit 302 displays a notification indicating a warning on the operation unit 116 and ends the series of steps of the registration process. The warning may be a notification indicating that "The default route is not settable using this function and is settable through the network settings for the main line". After completing displaying of the notification, the routing setting control unit 302 ends the series of steps of the registration process. When the process ends due to an error, an error notification may be displayed also in the area 703. In addition, in response to acceptance of a user operation for the area 703 or the error warning, the screen may be changed to the setting screen for the main line illustrated in FIG. 6A.

Although the case where, when an error occurs, a notification is displayed and the registration process is suspended has been described in the first embodiment by way of example, the configuration is not limited to this. The process may return to processing of S801 when the error notification is displayed in S805.

In addition, FIG. 8 illustrates the case where the determination as to whether the default route is set is made in response to acceptance of a user operation for confirming registration or editing. However, the configuration is not limited to this. For example, the determination may be made while the user is inputting the information via the pop-up screen illustrated in FIG. 7B. Specifically, the warning may be displayed in response to detection of inputting of "0.0.0.0" in the area 722.

Subsequently, a process of registering settings in the routing table 400 performed by the network control unit 311 of the OS 310 will be described with reference to the flowchart of FIG. 9. The flowchart of FIG. 9 illustrates control that is performed in response to booting of the system and in response to acceptance of a user operation for confirming modification of the network settings.

In S901, the network control unit 311 acquires the operation setting values managed by the line setting control unit 301 and registers the default gateway settings of the main line in the routing table 400 of the OS 310. When the default gateway address illustrated in FIG. 4 is set, path information including the destination of "0.0.0.0", the subnet mask length of "0", and the gateway address of "192.168.0.1" is registered in the routing table 400 of the OS 310.

In S902, the network control unit 311 refers to the user-defined path information managed by the routing setting control unit 302 to determine whether the user-defined path setting values are registered. If the user-defined path setting values are registered, the process proceeds to S903. If the user-defined path setting values are not registered, the network control unit 311 ends the series of steps of the registration process.

In S903, the network control unit 311 registers one piece of the user-defined path information in the routing table 400 of the OS 310. Then in S904, it is determined whether registration of all the pieces of the user-defined path information has been attempted. If it is determined that registration of all the pieces of the user-defined path information has been attempted, the network control unit 311 ends the series of steps of the registration process. If it is determined that a path for which registration has not been attempted remains, the process returns to S903, and the network control unit 311 attempts to register the next path in the routing table 400 of the OS 310.

The processes illustrated in FIGS. 8 and 9 described above can suppress the default route from being set in a duplicate manner via different setting screens.

Lastly, specific routing will be described with reference to FIGS. 10A to 11. FIGS. 10A and 10B illustrate examples of transmission-function-related screens displayed on the operation unit 116 of the MFP 101. In response to acceptance of a user operation for using the transmission function on a main menu (not illustrated), the CPU 111 displays a screen illustrated in FIG. 10A. FIG. 10A illustrates an example of a destination setting screen of the transmission function. FIG. 10A illustrates a case where a destination for transmission of a file to a "Scan" directory assigned an address "172.16.23.233" is set as the destination for the SMB server.

The user can set the destination by using a designate-destination key, by using an address book registered in the storage 114 in advance, or by directly inputting the destination, for example. FIG. 10B illustrates an example of a destination designation screen on which the user designates the destination of file transmission by using a software keyboard or the like. The user selects the transmission protocol and sets the host name (IP address), the folder path, and the user name and password used to access the server. In this manner, the user can set the destination of the transmission function.

In response to detection of selection of a send key (not illustrated) when the screen illustrated in FIG. 10A is displayed, the CPU 111 starts scanning an original and generating a scanned image in cooperation with the scanning unit 118. Then, the CPU 111 converts the generated scanned image into data having a file format set on the screen illustrated in FIG. 10A and transmits the data to the designated transmission destination. The data is transmitted to the network control unit 311 of the OS 310. The network control unit 311 performs a series of steps of control illustrated in the flowchart of FIG. 11 to determine the transmission destination of the data.

In S1101, the CPU 111 accepts a transmission start instruction, in response to which the process proceeds to S1102. Upon receipt of the transmission start instruction, a transmission function module scans an original and generates a file to be transmitted. The transmission function module then requests the network control unit 311 to transmit the file by using the designated protocol. Although FIG. 11 illustrates the case where the transmission function module that transmits scanned data transmits the data to an external apparatus by way of example, the case is not limited to this. Data (for example, a counter of the number of sheets subjected to printing or consumed levels of parts and consumables) collected by the MFP 101 may be transmitted to an external server.

In S1102, the network control unit 311 receives the data transmission request from the transmission function module or the like, and determines whether the transmission destination included in the data transmission request is a destination belonging to the same segment as the main line or the subline. Specifically, if the transmission destination is included within the subnet that is identifiable using the IP address and the subnet mask described in FIGS. 6A and 6B, the network control unit 311 determines that the transmission destination is a destination belonging to the same segment as the main line or the subline. If it is determined that the transmission destination is a destination belonging to the same segment as the main line or the subline, the process proceeds to S1103. On the other hand, if it is determined that the transmission destination is not a destination belonging to the same segment as the main line or the subline (that is, it is determined that the transmission destination is a destination that belongs neither to the segment of the main line nor to the segment of the subline), the process proceeds to S1104.

In S1103, the network control unit 311 transmits the data directly to the aforementioned transmission destination by using the communication unit I/F for which the IP address of the same segment as the designated destination is set. After completing the transmission, the network control unit 311 ends the series of steps of the process.

On the other hand, in S1104, the network control unit 311 determines whether the gateway corresponding to the transmission destination is successfully identified using the routing table 400. Specifically, if the transmission destination is in an address range identified by the destination and the subnet mask of any one of the entries, the network control unit 311 determines that the gateway is successfully identified. In this case, the process proceeds to S1105. When the transmission destination is in address ranges of a plurality of entries, an entry having the largest subnet mask length (that is, an entry having a narrow influential range) is preferentially selected. Note that when an entry of the default route (0.0.0.0/0) is registered, all the transmission destinations that do not satisfy conditions of the other entries match the entry of the default route. That is, when the default route is set in the routing table 400, the gateway for the output destination can always be identified. On the other hand, the transmission destination is in none of address ranges identified by the destination and the subnet mask of all the entries, the network control unit 311 determines that the gateway is not successfully identified. In this case, the process proceeds to S1106.

In S1105, the network control unit 311 transmits the data addressed to the transmission destination to the gateway address identified on the basis of the routing table 400. After completing the transmission, the network control unit 311 ends the series of steps of the process.

On the other hand, in S1106, the network control unit 311 notifies the requestor module that transmission has failed as a transmission error, and ends the series of steps of the process.

Through the series of steps of the process described above, the default route can be restricted from being set via the routing setting screen. Through this process, the method used by a user such as an administrator to input the default gateway can be limited to one. In addition, when setting of the default route is attempted via the routing setting screen, a warning is displayed. The warning can provide the user with a suggestion that the default gateway can be input using another method. Further, the screen displayed on the operation unit 116 can be changed to the setting screen for the main line in response to a user operation performed for the displayed warning. Accordingly, the user can easily reach the gateway setting screen without being cognizant of the hierarchy of the setting screen.

Second Embodiment

In the first embodiment, the description has been given of the case where the default route is prohibited from being set via the routing setting screen. In a second embodiment, a description will be given of a case where setting of the default route via the routing setting screen is permitted but the setting of the default gateway made as the network settings for the main line is prioritized. Since the hardware configuration and the software configuration of the second embodiment are substantially the same as those of the first embodiment, redundant description thereof is omitted.

Figure 14A:
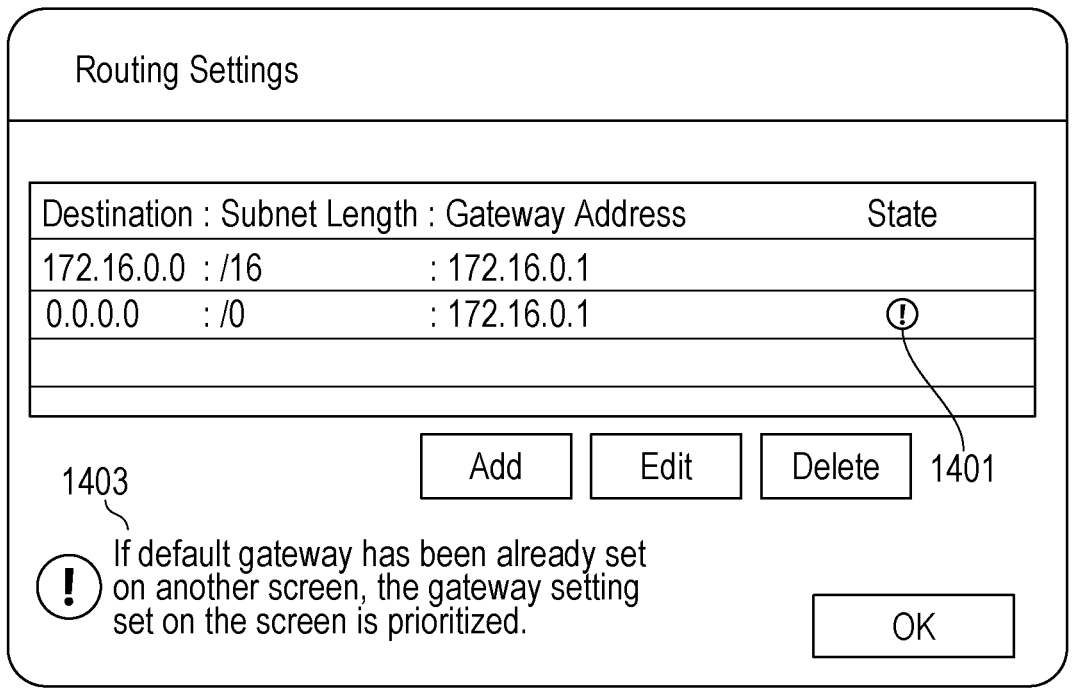
FIGS. 14A and 14B illustrate examples of screens displayed on the operation unit of the MFP.

FIG. 14A illustrates an example of a screen displayed on the operation unit 116 in the second embodiment. Unlike the first embodiment, registration of a routing path indicating the default route as a user-defined routing path is permitted in the second embodiment. FIG. 14A illustrates a state in which a routing path indicating the default route is registered. A notification icon 1401 is an icon that suggests a user that the setting may not be reflected in the routing table 400. In addition, when the default route is registered, a message 1403 that notifies the user that there is a possibility that the setting is not reflected in the routing table 400 correctly. In this example, the user is notified that when the default gateway has already been set on another screen, the gateway setting made on the other screen is prioritized.

Figure 12:
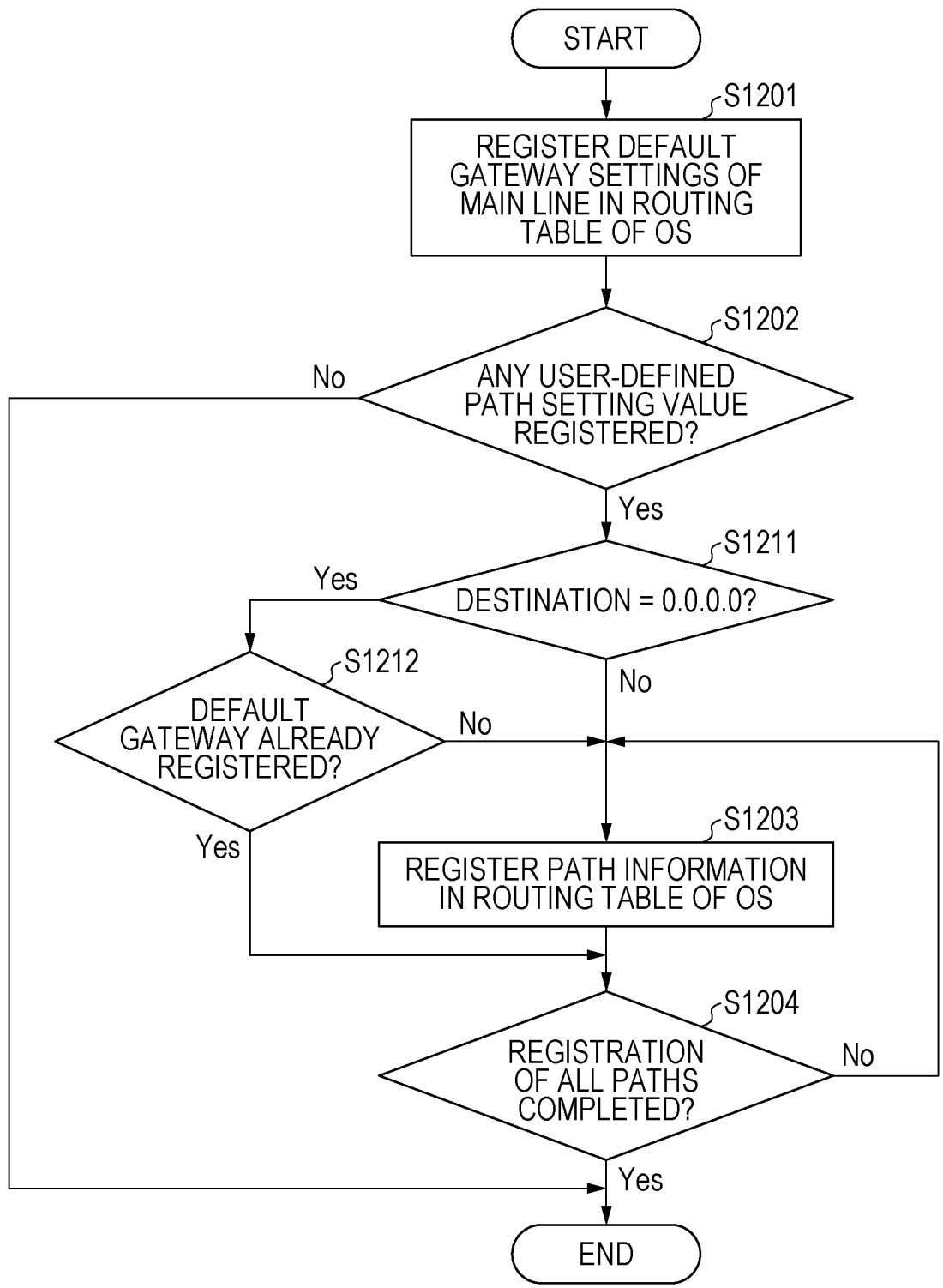
FIG. 12 is a flowchart illustrating an example of control performed when paths are registered in a routing table in a second embodiment.

A process of registering the default route in the routing table will be described next with reference to FIG. 12. FIG. 12 illustrates an example of a process that is performed in place of the process of the flowchart illustrated in FIG. 9 according to the first embodiment. Differences from FIG. 9 is that FIG. 12 additionally includes determination steps of S1211 and S1212.

Since processing of S1201 and S1202 is substantially the same as that of S901 and S902 illustrated in FIG. 9, respectively, redundant description thereof is omitted. If it is determined in S1202 that user-defined path setting values are set, the CPU 111 causes the process to proceeds to S1211.

In S1211, the network control unit 311 selects, as a registration candidate, one of pieces of user-defined path information and determines whether "0.0.0.0" is set as the destination in the selected piece of path information. If "0.0.0.0" is set as the destination, the process proceeds to S1212. If "0.0.0.0" is not set as the transmission destination, the process proceeds to S1203.

In S1212, the network control unit 311 determines whether the default route indicating the default gateway has already been registered in the routing table 400. If the network control unit 311 determines that the default route has already been registered, the process proceeds to S1204 without registering the path information selected as the registration candidate in the routing table 400. If the network control unit 311 determines that the default route has not been registered yet, the process proceeds to S1203, in which the path information selected as the registration candidate is registered in the routing table 400. Since processing of S1203 and S1204 is substantially the same as that of S903 and S904, respectively, redundant description thereof is omitted.

The control described above enables the default route to be set also via the routing setting screen and enables the settings of the default gateway set as the network settings for the main line to be prioritized. In addition, when the default gateway is not set as the network settings for the main line, the default gateway set via the routing setting screen can be used as alternative settings.

Third Embodiment

In the second embodiment, the description has been given of the case where setting of the default route via the routing setting screen is permitted but the settings of the default gateway set as the network settings for the main line are prioritized. In a third embodiment, a description will be given of a case where the settings made via the routing setting screen are prioritized and the settings of the default gateway set as the network settings for the main line are used as alternative settings. Since the hardware configuration and the software configuration of the third embodiment are substantially the same as those of the first embodiment, redundant description thereof is omitted.

Figure 14B:
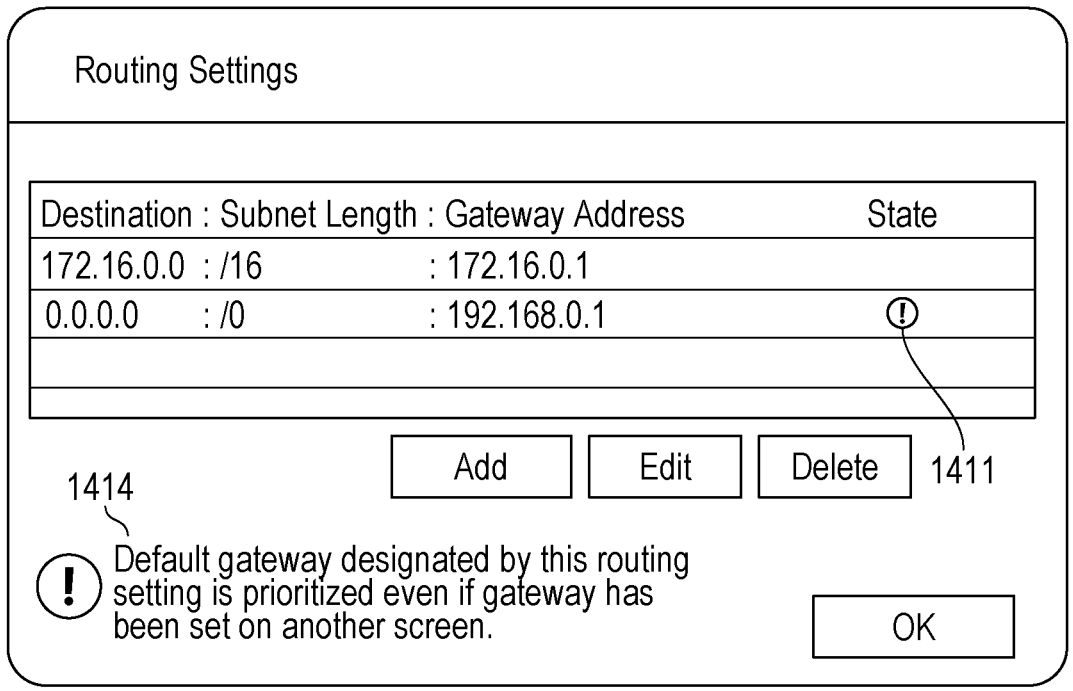

FIG. 14B is a diagram illustrating a screen displayed on the operation unit 116 in the third embodiment. As in the second embodiment, registration of a routing path indicating the default route as a user-defined routing path is permitted in the third embodiment. FIG. 14B illustrates a state in which a routing path indicating the default route is registered. A notification icon 1411 is an icon that suggests a user that this setting may be prioritized over the other setting values. In addition, a message 1414 is displayed that notifies the user that the settings made on this screen are prioritized over the settings made on the other screen when the default route is registered.

Figure 13:
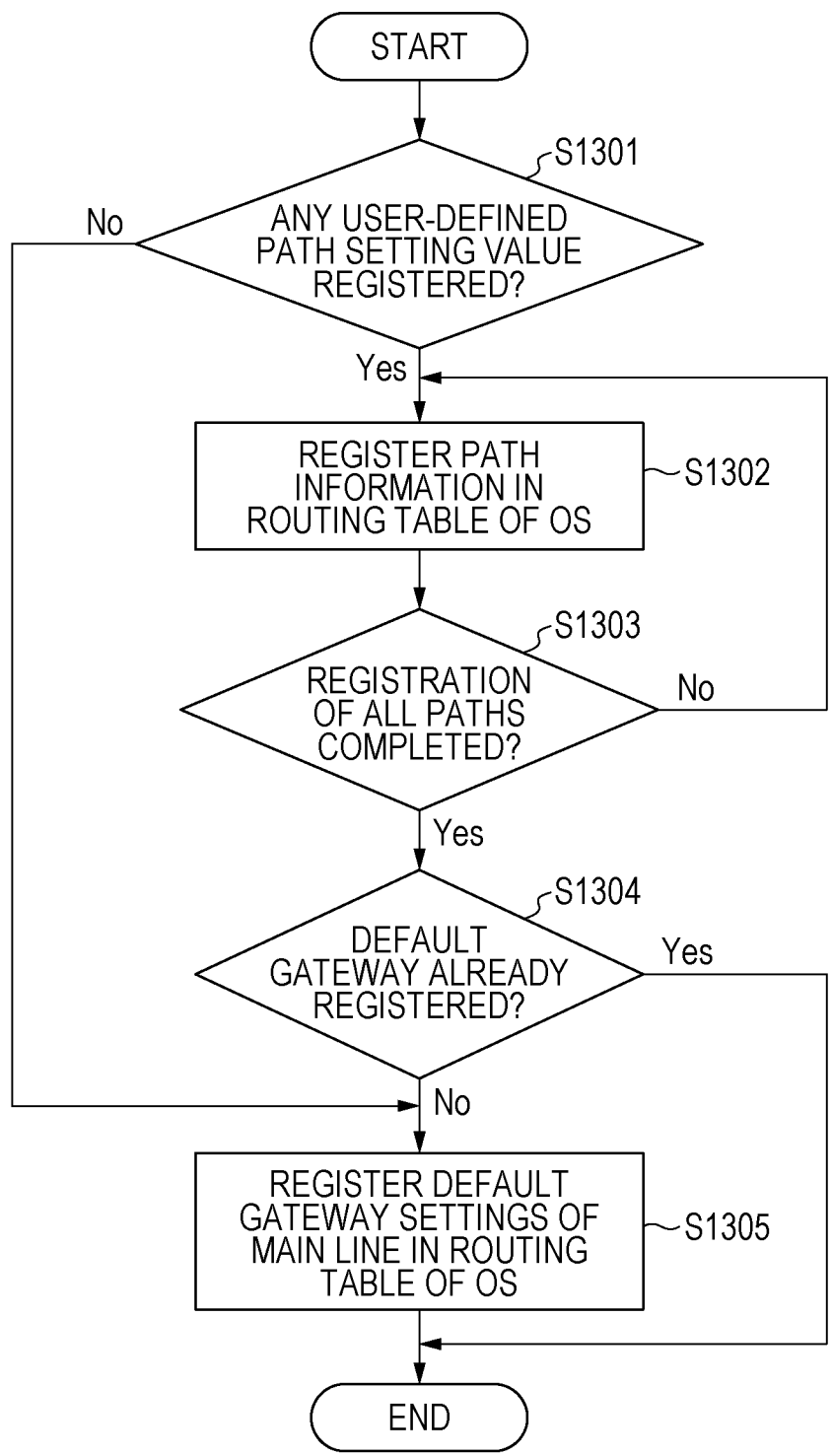
FIG. 13 is a flowchart illustrating an example of control performed when paths are registered in a routing table in a third embodiment.

A process of registering the default route in the routing table will be described next with reference to FIG. 13. FIG. 13 illustrates an example of a process that is performed in place of the process of the flowchart illustrated in FIG. 9 according to the first embodiment.

In S1301, the network control unit 311 determines whether user-defined path setting values are registered. If the user-defined path setting values are registered, the process proceeds to S1302. If the user-defined path setting values are not registered, the process proceeds to S1305.

In S1302, the network control unit 311 refers to the user-defined path setting values managed by the routing setting control unit 302 and registers one of pieces of the user-defined path information in the routing table 400 of the OS 310. Then in S1303, it is determined whether registration of all the pieces of the user-defined path information has been attempted. If it is determined that registration of all the pieces of the user-defined path information has been attempted, the process proceeds to S1304. If it is determined that a path for which registration has not been attempted remains, the process returns to S1302 and the network control unit 311 attempts to register the next path in the routing table 400 of the OS 310.

In S1304, it is determined whether the default gateway has already been registered in the routing table 400. It is determined that the default gateway has already been registered if "0.0.0.0/0" indicating the default route has already been registered, and the series of steps of the process ends.

On the other hand, if it is determined that the default gateway has not been registered yet, the process proceeds to S1305.

In S1305, the network control unit 311 registers the default gateway settings for the main line in the routing table 400 of the OS 310. Processing of S1305 is alternative processing performed in the case where the default gateway has not been set on the routing setting screen.

The control described above enables the default gateway setting made via the routing setting screen to be prioritized.

Modifications

Although the case is exemplified where the network settings such as the routing table 400 are set on the basis of user operations performed via the operation unit 116 of the MFP 101 in the present embodiments, the case is not limited to this.

For example, the MFP 101 may include a remote user interface (UI) service and provide a remote UI function that enables device settings and management of the MFP 101 to be performed via a web browser of an external apparatus. In this case, the network settings can be made via the web screen. The user uses the remote UI service via a web browser or the like of an external apparatus so as to be able to confirm or modify various device settings of the MFP 101 on a display of a PC or the like. Alternatively, the present embodiments are also applicable to the case where the MFP 101 has a function of collectively registering (importing) settings of the device using a file of a JavaScript (registered trademark) Object Notation (JSON) format. In this case, even if the default route is designated in the user-defined path information, the route is not imported and is discarded in the first embodiment. In the second and third embodiments, importing of all the network settings is permitted, and the registration control on the routing table 400 described above is then performed.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest inter- This application claims the benefit of Japanese Patent Application No. 2019-068842, filed Mar. 29, 2019, which is hereby incorporated by reference herein in its entirety.

What is claimed is:

1. An information processing apparatus for transmitting data to an external apparatus via a plurality of different communication interfaces, the information processing apparatus comprising:

at least one memory that stores a set of instructions; and
at least one processor that executes the instructions to provide:

displaying a first screen for accepting a setting of an IP address, subnet information and a default gateway, the setting being a network setting of a first line, displaying a second screen for accepting a setting of an IP address and subnet information, the setting being a network setting of a second line, and not accepting a setting of a default gateway, displaying a routing setting screen for accepting a setting of a static routing path;

accepting a user operation of inputting a destination address, subnet information, and a gateway address via the routing setting screen as a setting of a static routing path, performing control such that a static routing path indicating acommunication path to a default gateway is not set as the setting of a static routing path of the information processing apparatus via the routing setting screen, and registering a user defined static routing path based on the input destination address, the input subnet information, and the input gateway address in a storage area, in a case where it is determined that the user defined static routing path is a communication path different from the communication path to the default gateway.

2. A method of controlling an information processing apparatus for transmitting data to an external apparatus via a plurality of different communication interfaces, the method comprising:

displaying a first screen for accepting a setting of an IP address, subnet information and a default gateway, the setting being a network setting of a first line;

displaying a second screen for accepting a setting of an IP address and subnet information, the setting being a network setting of a second line, and not accepting a setting of a default gateway;

displaying a routing setting screen for accepting a setting of a static routing path;

accepting a user operation of inputting a destination address, subnet information, and a gateway address via the routing setting screen as a setting of a static routing path;

performing control such that a static routing path indicating a communication path to a default gateway is not set as the setting of the static routing path of the information processing apparatus via the routing setting screen; and registering a user defined static routing path based on the input destination address, the input subnet information, and the input gateway address in a storage area, in a case where it is determined that the user defined static routing path is a communication path different from the communication path to the default gateway.

3. The method according to claim 2, further comprising accepting a setting of a default gateway address as network settings, based on a user operation via a second screen that is different from the routing setting screen.

4. The method according to claim 3, further comprising registering a routing path indicating the communication path to the default gateway in a routing table, based on the setting of the default gateway address accepted via the second screen and the setting accepted via the first screen.

5. The method according to claim 3, further comprising further accepting a setting of an Internet Protocol address and a setting of a subnet mask in addition to the setting of the default gateway address via the second screen, as the network settings for a first communication interface among the plurality of different communication interfaces.

6. The method according to claim 5, wherein in a case where a setting with which the network settings are made using a Dynamic Host Configuration Protocol is accepted via the second screen, a gateway address distributed from a Dynamic Host Configuration Protocol server on a network is set as the setting of the default gateway for the first communication interface.

7. The method according to claim 2, further comprising determining whether the static routing path input via the routing setting screen indicates the communication path to the default gateway.

8. The method according to claim 2, wherein the static routing path indicating the communication path to the default gateway is path information in which information indicating a destination of data indicates a predetermined destination.

9. The method according to claim 8, wherein a destination address indicating the predetermined destination is 0.0.0.0.

10. The method according to claim 2, further comprising providing a user with a predetermined notification upon condition that a user operation for setting the static routing path indicating the communication path to the default gateway is received via the routing setting screen.

11. A non-transitory computer-readable storage medium storing a computer-executable program for causing a computer to execute a method of controlling an information processing apparatus for transmitting data to an external apparatus via a plurality of different communication interfaces, the method comprising:

displaying a first screen for accepting a setting of an IP address, subnet information and a default gateway, the setting being a network setting of a first line;

displaying a second screen for accepting a setting of an IP address and subnet information, the setting being a network setting of a second line, and not accepting a setting of a default gateway;

displaying a routing setting screen for accepting a setting of a static routing path;

accepting a user operation of inputting a destination address, subnet information, and a gateway address via the routing setting screen as a setting of a static routing path;

performing control such that a static routing path indicating a communication path to a default gateway is not set as the setting of a static routing path of the information processing apparatus via the routing setting screen; and registering a user defined static routing path based on the input destination address, the input subnet information, and the input gateway address in a storage area, in a case where it is determined that the user defined static routing path is a communication path different from the communication path to the default gateway.

12. The method according to claim 2, further comprising registering the static routing path in a routing table, based on the user defined static routing path stored in the storage area.

13. The method according to claim 11, wherein packet data is transmitted to a gateway identified based on path information registered in the routing table.

* * * * *